United States Patent
Lundstrom

[11] Patent Number: 5,808,443
[45] Date of Patent: Sep. 15, 1998

[54] BATTERY CHARGING METHOD

[76] Inventor: John W. Lundstrom, 603 Crestview Dr., Glendora, Calif. 91741

[21] Appl. No.: 770,698

[22] Filed: Dec. 19, 1996

[51] Int. Cl.$^6$ ........................ H01M 10/44; G01N 27/416
[52] U.S. Cl. ................................ 320/32; 320/21; 320/48; 324/433
[58] Field of Search .................... 320/9, 22, 32, 320/39, 48, 21, 1; 324/430

[56]     References Cited

U.S. PATENT DOCUMENTS

| | | | |
|---|---|---|---|
| 4,876,513 | 10/1989 | Brilmyer et al. | 320/48 |
| 5,352,968 | 10/1994 | Reni et al. | 320/35 |
| 5,396,163 | 3/1995 | Nor et al. | 320/21 |
| 5,485,090 | 1/1996 | Stephans | 324/433 |
| 5,596,259 | 1/1997 | Mino et al. | 320/21 |

*Primary Examiner*—Peter S. Wong
*Assistant Examiner*—Patrick B. Law
*Attorney, Agent, or Firm*—Derrick Michael Reid

[57]     ABSTRACT

A backup battery charger measures charging capacitor voltage and charging battery current to calculate battery charging circuit resistance and open circuit float battery voltage. Microcontroller computation of the backup battery float battery voltage and battery charging circuit resistance changes enable efficient charging and monitoring of battery conditions.

7 Claims, 4 Drawing Sheets

BATTERY CHARGING METHOD

FIELD OF THE INVENTION

The invention relates to the field of batteries, chargers and charging methods. More particularly, the invention relates to the determination of the electrial operating levels in charging circuits during charge which is useful in both charging of vehicle storage batteries and if float charging of backup storage batteries.

BACKGROUND OF THE INVENTION

Battery chargers have long been used to charge secondary storage batteries that can be charged. When charging secondary storage batteries, it is necessary to avoid applying excess charge energy in order to minimize electrolyte loss, prevent plate damage, and effect a general saving of electrical energy. A number of methods exist which measure various conditions of the battery during charge, such as rate of change of voltage with time, comparison of this rate of change with ideal rate of change slope or gradient templates, battery internal resistance, and others. Battery charge is then terminated at a correct point as a result of the information gained about the battery from one or more of these measurements.

The mechanism of measurement of internal resistance during charge has taken many forms. This measurement will show an increase in internal resistance when the battery begins to convert the electrical energy into gas rather than continue the electro-chemical conversion of its plates. Thus, the determination of the gas conversion point establishes a point near the end of charge, when charging can be completed by timing the balance of the charge energy input.

U.S. Pat. No. 5,376,873, issued to Toya, discloses a three part sequential charging method based upon fixed time charging, charging until a voltage difference, and charging to a peak voltage. U.S. Pat. No. 5,339,018, issued to Brokaw, discloses a temperature based charging method using comparators to approximated charging reference gassing curves. U.S. Pat. No. 5,432,426, issued to Yoshida, discloses storing in memory a most recent charging gradient. U.S. Pat. No. 5,469,043, issued to Cherng et al, discloses charging by sweeps. These patents disclose means to charge a battery at the most efficient rate but disadvantageously do not directly measure charging battery resistance to determine the gassing point for maximum charging rates.

U.S. Pat. No. 4,956,597, issued to Heavey et al, describes a method of measurement of gassing point when battery internal resistance increases using a periodically applied resistive load. The load is applied across the charger terminals for a short period, while the terminal voltage is measured. When the battery internal resistance is low during the electro-chemical conversion phase, the change in terminal voltage will be small. When the battery gassing phase is active, the change in terminal voltage will be greater when the resistive load is applied due to the higher battery internal resistance. Thus it is possible to determine when the gas point is reached by comparison of the change of loaded and unloaded terminal voltage as the charge progresses. This method disadvantageously requires the addition of a power load resistor to the chargers, and a power switching device such as a transistor, to effect the loading of the charging circuit.

U.S. Pat. No. 5,408,170, issued to Umetsu et al, describes a method of periodically interrupting the charge current to the battery, and making a comparison of the voltage difference of the battery voltage an measured through the charging cable with no charge current, and the charger output voltage with current flowing to the battery. The charger cable resistance will be a constant in this measurement, and the battery internal resistance can be inferred from the differences in the voltage measurements. This charging method disadvantageously requires the addition to the charger of a power switching device, such as a transistor, and requires suitable driving circuitry to effect an interruption of the charger current.

U.S. Pat. No. 5,352,968, issued to Reni et al, relies on a measurement of the battery internal series resistance, as well as other factors to determine the present battery state as a means for terminating charge correctly. This patent teaches the use of a useful set of equations to calculate battery series internal resistance and open circuit battery voltage.

U.S. Pat. No. 5,345,162, issued to Shiojima, amplifies the noise pulses present at the battery terminals during charge, to determine the battery characteristics as relates to state of charge. Although the source of these noise pulses is not explored, it seems reasonable to believe that during late charge state gassing, the internal resistance of the battery will vary with the instantaneous state of the gas bubbles covering the plates. As more or less bubbles cover the active plate area, the battery internal resistance will vary accordingly. Thus when gassing is vigorous, one might expect that the minute voltage variations, or pulses, to be of a higher peak to peak value.

U.S. Pat. No. 5,307,001, issued to Heavey, describes the use of the gassing point of the battery to determine the character of the battery charge related to the proper termination point. In this example, battery voltage is periodically measured and stored, for comparison at a later time with another measurement. The gassing point is determined by a larger difference in two measurements of the battery voltage. This method also derives the information from the basic increase in battery internal resistance when gassing begins.

U.S. Pat. No. 5,214,385, issued to Gabriel et al, teaches the use of a low frequency square wave applied to the battery to generate a voltage wave form which is related to variations in polarization voltage changes. The leading edge step change of all the wave forms shown is a result of the internal resistance of the battery, and consequently, the peak values of the wave forms that are directly affected in part by the battery internal resistance.

Various methods have been use to float charge back up batteries without exceeding the recommended voltage. When charging long life float charged backup storage batteries it is important that the recommended value of float voltage not be exceeded during charge. Backup storage batteries are used during power failure episodes and are designed for operation at a constant maximum float voltage, and state of charge. It is recommended for long life of backup storage batteries, that the float voltage is not exceeded at any time during charge.

Two primary methods for measurement of battery terminal voltage have been used to achieve a constant voltage condition used in float charging. One method employs the use of a additional pair of sensing wire leads directly to the battery terminals. For example, U.S. Pat. No. 5,321,347, issued to Chien et al, discloses another method whereby the battery charging current is intermittently applied, and battery voltage measurements are used to determine when the charge should be terminated. The internal resistance of the battery is the mechanism which causes the battery terminal voltage to be higher when charge current is applied, than when there is no current being supplied to the battery. This invention utilizes an additional pair of leads which are shown attached directly to the battery terminals, by which the battery voltage is measured. This invention disadvantageously requires the use of additional sensing leads.

The second method employs the use of sample hold techniques, where the voltage at the charger terminals is measured during a period of zero current to the battery. Zero current to the battery can be achieved by periodic interruption of the charge by switched means or by control means. For example, U.S. Pat. No. 5,408,170 describes a method for disadvantageous periodic interruption of charging current to the battery.

In remote sites and unattended installations, it is important that the charging cables and connections remain in continued good operating condition. Leads and connections can deteriorate from corrosion or inadvertent physical damage. Good leads and connections are necessary for reliability of the backup battery function. It is disadvantageous to have a remote charger without a means of monitoring of the charging operation. Various methods of charging back storage batteries have used terminal leads, have not been effective for remote charging monitoring, have used a multiplicity of charger components, have not effectively measured open circuit battery voltage, and have not continuously measured the battery resistance for maximum charging efficiency. These and other disadvantages are solved or reduced using the invention.

SUMMARY OF THE INVENTION

An object of the invention is to dynamically determine the resistance of the battery charging circuit.

Another object of the invention is to determine dynamically while charging, the open circuit battery voltage.

Yet another object of the invention to measure the open circuit battery voltage while charging with a reduced number of charger components.

Still another object of the present invention is to determine the charging circuit resistance for detecting internal series battery resistance changes that signal the gassing point of the charging cycle.

The invention is a method for dynamically determining the charge related changes in battery internal resistance as required for proper charging control. The present invention uses a conventional set of equations to calculate battery series internal resistance and open circuit battery voltage. The invention dynamically determines the charging loop resistance during charging and determines the open circuit battery voltage calculated dynamically while the battery is being charged.

The method is preferably embodied in a battery charging circuit which includes the battery charger terminals and internal connections, the charging cable resistance, the battery terminal connections, the internal battery series resistance, and the charger current measurement shunt resistor. The open circuit battery voltage is calculated directly from the determined charging circuit resistance, and the average charger voltage and average charging circuit current. The invention dynamically determines the open circuit battery voltage without charge interruption nor with extra battery voltage sensing lead wires. It has been discovered that measurement and comparison of charging circuit resistance during battery charge will enable gas point detection, and consequent correct termination of battery charge. The invention is an effective method of determining changes in battery internal series resistance.

In the preferred form, a power transformer provides ripple current and voltage through controlled rectifiers to charging capacitor providing power to the battery under charge. Measurements of the charging current and of the charger output voltage are made at two times during the natural R-C discharge of the stored energy in the capacitor into the charging circuit including battery and cable leads. The first of these current and voltage measurements is made just after a rectifying diode stops conducting and diode stored charge is depleted, and the second of these two measurements of current and voltage is made shortly before a rectifying diode begins conducting again to restore the charge to the storage filter capacitor from the next half cycle of the AC wave of the power transformer. From these measurements, a programmed microcontroller can dynamically compute changes in the charging resistance circuit, which changes are related to changes in the internal resistance of the battery to determine the gassing point and control the charging of the battery. The method of measurement and control to the accurate determination of charging circuit resistance is insensitive to exact time interval measurement, stability of the storage capacitor, and nominal levels of voltage or current.

In the preferred form, the battery is assumed to be perfect with a open circuit voltage and a small variable internal resistance that is related to the internal character of the battery, and which is included in the dynamic charging circuit resistance measurement. By monitoring the charger current and the total charging circuit resistance, the voltage difference from the battery charger terminals to the equivalent open circuit battery terminals can be calculated, and that result subtracted from the charger terminal voltage to obtain the open circuit battery voltage. Also, changes in the charging circuit resistance are caused by changes in the internal resistance when the gassing point is reached. The gassing point is determined by detecting a change in the charging circuit resistance, that is, the point when gassing begins during battery charge. Determining the gassing point during charge permits accurate reduction and termination of the charging current.

Using this battery charging method, the recommended value of open circuit battery voltage, that is, the float voltage, is not exceeded during charging of the long life backup storage batteries. A primary use of this invention is float charging of backup storage batteries operating at a constant maximum float voltage, and state of charge. The present invention provide efficient charging without exceeding the float voltage for long life safer operation of the backup storage batteries. The method uses dynamic variable measurements for determining the conditions of the battery on a continuous dynamic basis using a set of equations. The dynamic charging resistance measurement will allow continued monitoring and control of the float voltage. During monitoring, damage to charging leads or connections can be detected. The invention eliminates the need for additional voltage sensing leads. These and other advantages will become more apparent from the following detailed description of the preferred embodiment.

DETAILED DESCRIPTION OF THE PREFERRED EMBODIMENT

Figure 1:
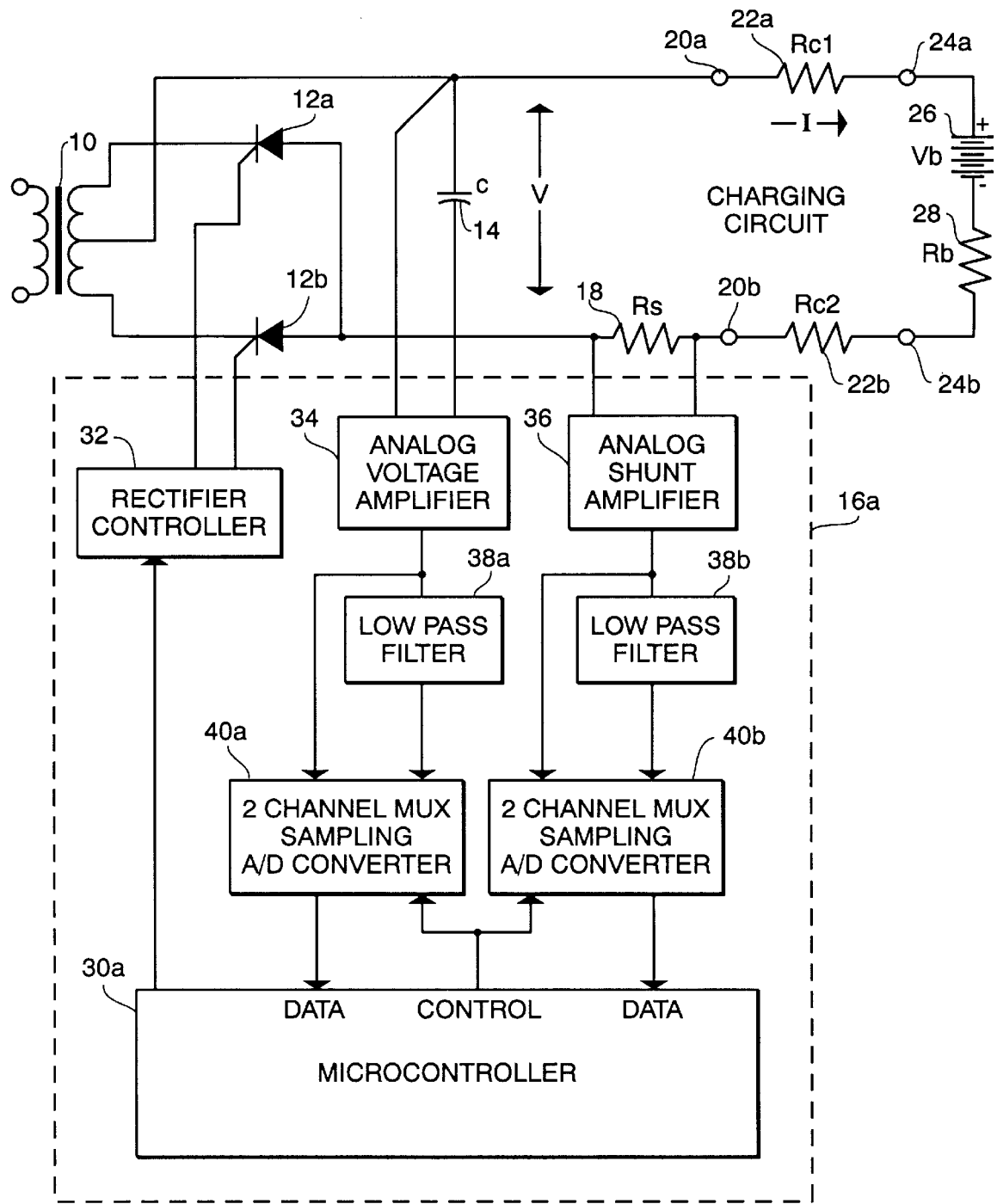
FIG. 1 is a schematic diagram of a microcontroller charger circuit.
Figure 2:
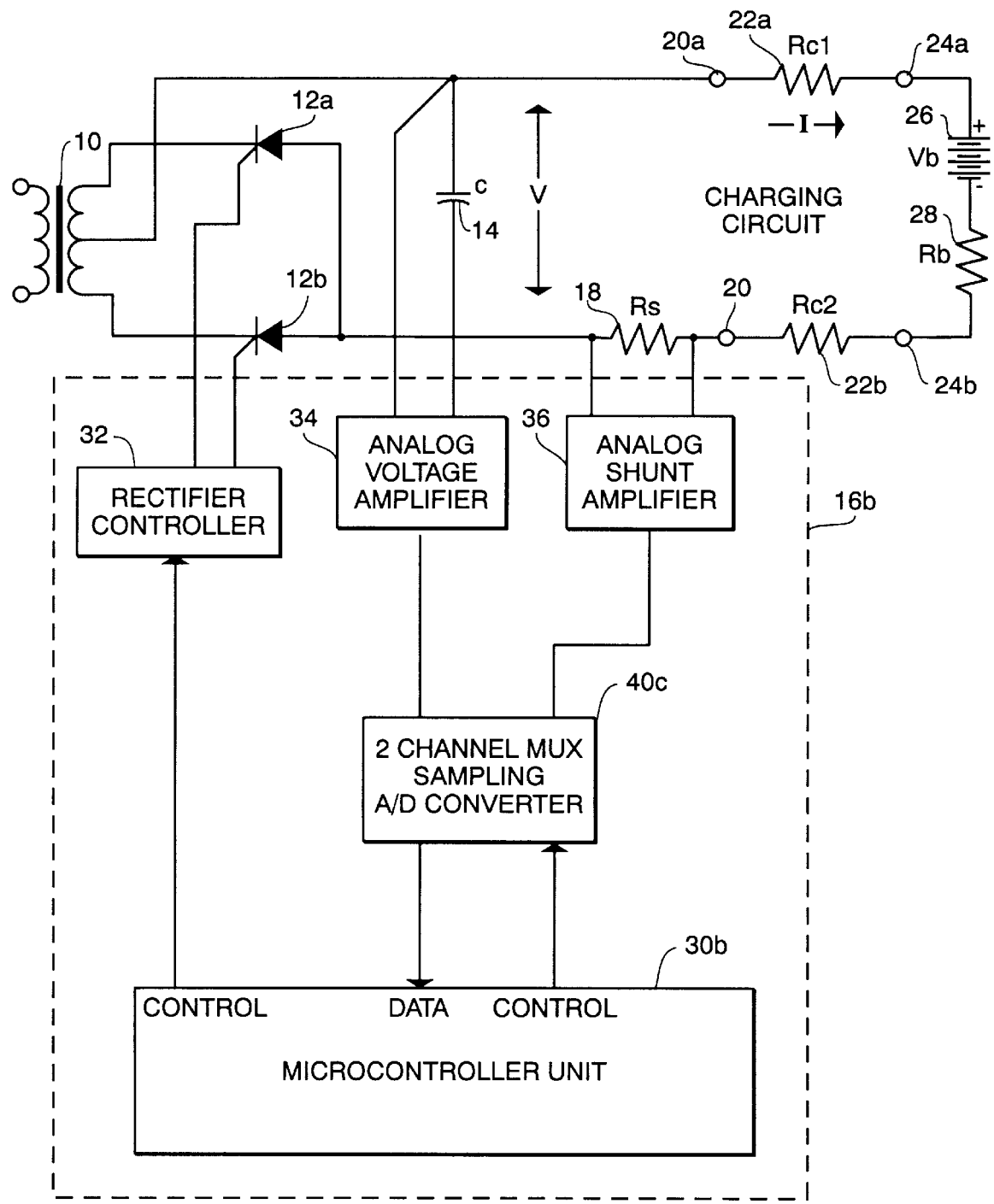
FIG. 2 is a schematic diagram of a economic microcontroller charger circuit.

An embodiment of the invention is described with reference to the figures using reference designations as shown in the figures. Referring to FIGS. 1 and 2, the preferred battery charger system comprises an AC line driven power transformer 10, rectifying diodes 12a and 12b, a charger capacitor 14 having a capacitance value C and a charging voltage V, a charging controller 16a or 16b, and a shunt resistor 18 having a resistance Rs. The capacitor 14 and shunt resistor 18 are connected to charger terminals 20a and 20b to which is connected a pair of leads designated as respective cable resistors 22a and 22b having resistance Rc1 and Rc2 respectively, which are in turn respectively connected to battery terminals 24a and 24b of a battery 26 having a battery voltage Vb and an internal battery resistance 28 having a resistance value of Rb. The charger capacitor 14 is used to reduce ripple voltage and current in the charging circuit comprising the leads 22 and battery 26.

Both of the charging controller 16a or 16b preferably include a microcontroller 30a or 30b respectively, a rectifier controller 32 connected to current shunt resistor 18 and controlling the rectifiers 12, an analog voltage amplifier 34 connected to and sensing the voltage V across the capacitor 14, and an analog shunt amplifier 36 connected to and sensing the current I through the battery 26. The charging controller 16a includes two low pass filters 38a and 38b and two respective two channel multiplexed analog to digital (A/D) converters 40a and 40b, whereas the charging controller 16b includes one two channel A/D converter 40c.

Many different conventional devices can be used to accomplished the desired functions. Typically the gain of the analog voltage amplifier 34 will be one tenth v/v, but will vary with the voltage of the battery being charged, and the input voltage range of the A/D converters 40. Typically the gain of the analog shunt amplifier 36 will be one hundred v/v, but will vary depending upon the value of the current shunt resistor 18, the value of the charging current being measured, and the input voltage range of the A/D converters 40. The low pass filters 38a and 38b will generally have an attenuation of forty db at twice the frequency of the AC line. For applications requiring less accuracy, a lower value of attenuation may be used. A suitable multiplexed sampling A/D converter 40a, 40b or 40c could be the MAX186DEPP or LTC1298CN8, although others are available which can equally effectively be used. A suitable micro-controller 30a or 30b could be the PIC16C64 or PIC16C65, although others can equally used as well.

The operation of the charger system relies upon well understood RC time constant circuits having an initial Vo representing the peak value of the transformer AC wave at the output of the rectifying diodes 12 when turned off and not conducting. The rectifying diodes 12 represent the action of a switch with no connection after conduction stops and stored charge is depleted. The charger filter capacitance C of capacitor, and the total series resistance R define the RC time constant. The total series resistance of the charger circuit includes all connections of the terminals 20 and 24, cable resistance Rc1-2, current measuring shunt resistance Rs of the shunt resistor 18, and battery internal series resistance Rb of internal resistance 28. Vb represents the open circuit voltage of the battery. I represents the charging circuit current and V represents the voltage across the charger output filter capacitor 14. Initially, V=Vo and is greater than Vb at time zero, but exponentially decays towards Vb as the current also decays towards zero. Two measurements are taken at t1 and t2. The time t1 is when the first dynamic measurement of filter capacitor voltage V1 and charger circuit current I1 is made. The time t2 is when the second dynamic measurement of filter capacitor voltage V2 and charger circuit current I2 is made. V1 and V2 are greater than Vb, V1 and I1 are greater than V2 and I2 respectively because t1 and t2 measurements are taken while the capacitor 14 is still discharging to charge the battery 26 and charging current is still flowing. The charging circuit resistance R is calculated by the expression R=(V1−V2)/(I1−I2), where V1 and I1 are the time t1 voltage V and current I measurements and V2 and I2 are the time t2 voltage V and current I measurements, with the resulting charging circuit resistance shown as R. The variables of the value of the capacitance C, the difference between t1 and t2, the initial voltage Vo, the battery voltage Vb, and the nominal levels of measured voltage V1-2 and current I1-2 are not critical to an accurate calculation of the value of total series resistance R.

The microcontroller 30a of FIG. 1 provide control signals to the A/D converters 40a and 40b and compute the battery charging circuit resistance R and the open circuit battery voltage Vb. The open circuit battery voltage Vb is calculated by preferably measuring the average voltage Vave and average current Iave using low pass filters 38a and 38b where Vb=Vave−(R×Iave). The accuracy of calculation of the value of the Vb is also insensitive to device tolerances and initial conditions. The microcontroller 30a also controls the rectifying diodes 12 to charge the capacitor 14. The voltage V across the capacitor is amplified to an appropriate level by the analog voltage amplifier 34 having an unfiltered output connected to one channel of the two channel multiplexed sampling A/D converter 40a. The low pass filter 38a is used to generate a smoothed charger voltage signal Vave communicated to the second input channel of the A/D converter 40a. Similarly, the voltage waveform generated by the passage of the charging circuit current through the shunt resistor 18 is amplified by the analog shunt amplifier 36, with an unfiltered output being connected to one input of a second two channel multiplexed sampling A/D converter 40b. A smoothed charger current signal Iave is derived from the output of a second low pass filter 38b, the output of which is connected to a second input of A/D converter 40b.

The average charger output filter capacitor voltage Vave and average charging circuit current Iave can be measured with the same sampling A/D converters 40a and 40b which are used for the resistance computation. Alternate multiplexed A/D inputs from the low pass filters 38a and 38b are selected to measure Vave and Iave respectively from the capacitor 14 and current shunt resistor 18. The Vave and Iave measurement are used to control the battery float voltage. Battery open circuit battery voltage Vb can be calculated from the following expression: Vb=Vave−(R×Iave), where Vb is the battery open circuit voltage, Vave is the average charger voltage, R is the charging circuit resistance and Iave is the average charging circuit current.

Figure 3:
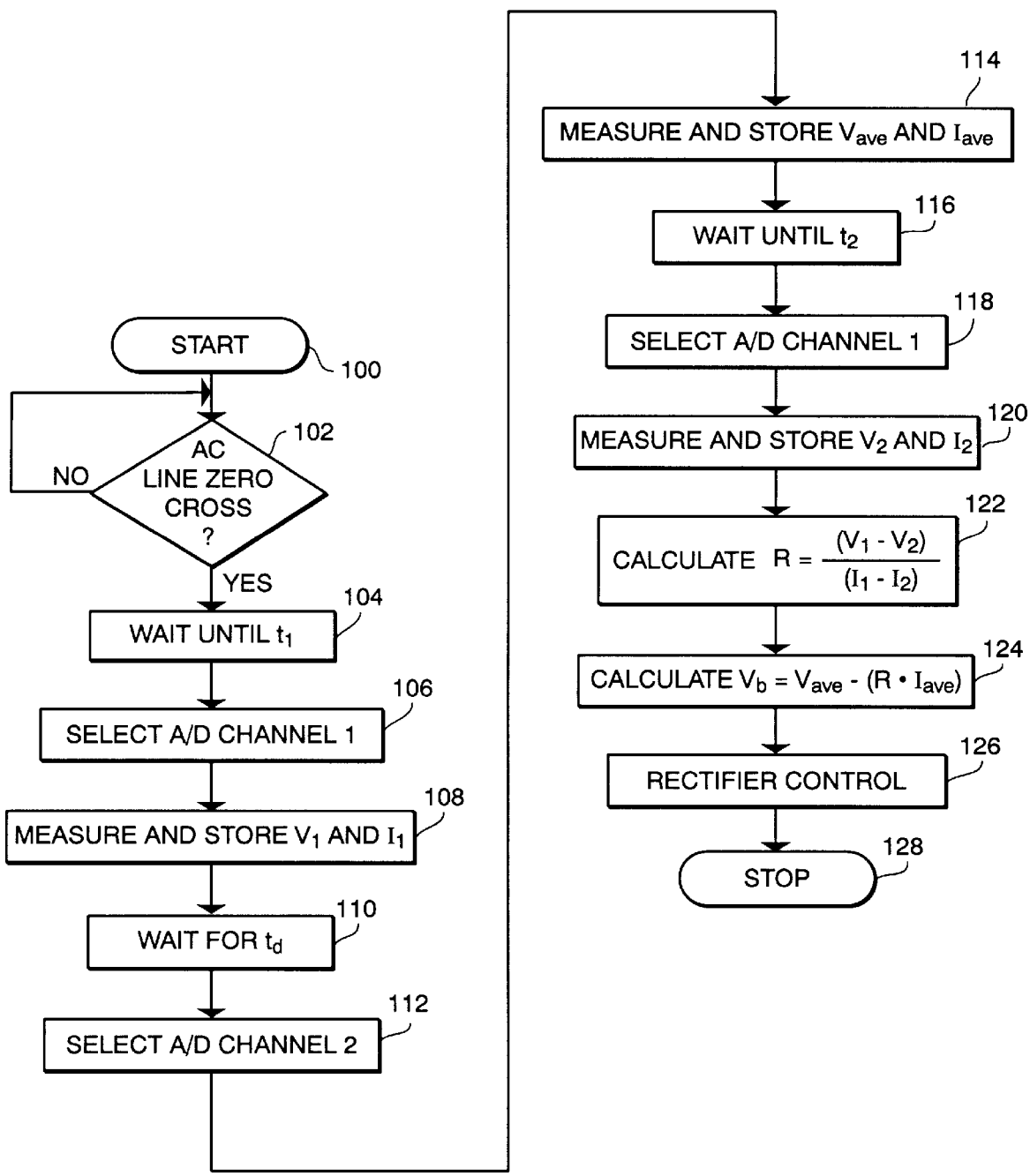
FIG. 3 is a flow diagram for the a microcontroller charger circuit

The microcontroller 30 of FIG. 1 performs control and calculations in accordance with the flow diagram of FIG. 3. The preferred charger system of FIG. 1 computes the charging circuit resistance and open circuit battery voltage during float charging. Using the microcontroller 30 and fast sampling A/D converters 40, the instantaneous measurement of current I and voltage V is accomplished with conventional electronic components. For economic reasons, a single multiplexed A/D converter 40c of FIG. 2 can be used if the time between sampled voltage and sampled current measurements is small compared to the time between the two sets of measurements. A negligible error will result when these conditions are met.

Referring FIG. 3, the measurement and calculation process is a part of the total programming for controlling the charger. From related programming execution, the process starts 100 and waits 102 for the zero crossing point of the AC power waveform is determined as the point Vo time at t0 from which time t1 is referenced. Time t1 is determined to be on the normal discharge curve for the value C of the capacitor 14, and the accumulated series resistance R in the charging circuit including charging lead wires Rc1 and Rc2, internal battery series resistance Rb, and current measuring shunt resistor R. After time t1 wait state has elapsed 104, both A/D converters 40a and 40b are controlled to select 106 inputs from respectively first channels to which are connected the unfiltered signals from amplifiers 34 and 36 which respectively represent the voltage V across capacitor 14 and the current I passing through the shunt resistor 18. Both A/D converters 40a and 40b are next commanded to convert their respective input signals, and return 108 the digital values V1 and I1 as concurrent measurements to the microcontroller 30a for storage and later processing computation and control. Another wait state 110 of time length td is elapsed. Time td will cause the Vave and Iave measurement 114 to start at a point which is approximately half-way between times t1 and t2. Time td is ideally selected to elapse at the time when the dynamic levels of voltage V across capacitor 14 and current I passing through shunt resistor 18 are equal to their respective average DC levels, that is, when Vave equals Iave×Rs. When td has elapsed, the A/D converters 40a and 40b are commanded by the microcontroller 30a to select 112 respective second input channels to convert outputs of the low pass filters 38a and 38b, respectively providing Vave representing the average DC level of the voltage V and a voltage corresponding to Iave representing the average DC level of the current through the shunt resistor 18. Both A/D converters 40a and 40b are next commanded to convert their respective input signals, and return 114 the digital values Vave and Iave as concurrent measurements to the microcontroller 30a for storage and later processing computation and control. After time t2 wait state has elapsed 104, both A/D converters 40a and 40b are controlled to select 118 inputs from respectively first channels to which are connected the unfiltered signals from amplifiers 34 and 36. Both A/D converters 40a and 40b are again commanded to convert their respective input signals, and return 120 the digital values V2 and I2 as concurrent measurements to the microcontroller 30a for storage and later processing computation and control. The dynamic values V1, I1, V2 and I2 are then used by the microcontroller 30a to calculate 122 the charging circuit series resistance R. The microcontroller 30a then uses the average values Vave and Iave, and the series resistance value R to compute the open circuit float voltage Vb of the battery 26. These calculated values are used by the microcontroller 30a to generate 126 control signals to rectifier control 32 to control rectifying diodes 12 to charge the battery 26 prior to process completion 128. The diodes 12 are silicon controlled rectifiers having phase delayed firing. The calculated value Vb is used to control the phase delayed firing. The phase delay firing of the diodes 12 is increased when the Vb greater a predetermined value, and is decreased when Vb is lower that this predetermined value.

Referring to FIGS. 1 and 2, and more particularly to FIG. 2, the charge controller 16b does not include low pass filters 38a and 38b of charge controller 16a, and therefore charge controller 16b only includes one A/D converter 40c. This charge controller 16b will generate computation results which may be less accurate than those obtained by charge controller 16a, but the reduction of components count in charge controller 16b will result in a lower production cost where extreme accuracy is not required. The charge controller 16b functions similarly to the charge controller 16a but without the ability to directly measure Vave and Iave using low pass filters. Instead, the V and I signals from the analog voltage amplifier 34 and the analog shunt amplifier 36 are applied directly to channels 1 and 2 respectively of the single two channel multiplexed sampling A/D converter 40c. Because no low pass filters are present to smooth the raw voltage and current signals, Vave and Iave must be measured at times when the instantaneous value of V and I are approximately equal to the real DC levels of Vave and Iave, respectively. Because only one A/D converter 40c is used, V1 can not be measured concurrently with I1, nor V2 with I2. Hence, the time between each respective instantaneous voltage and current measurement pairs, V1 and V1, Vave and Iave, and V2 and I2, should be as short as practicable for minimum error. V1 is measured at t1, and I1 is measured a short time later. Vave is measured t1+td, and Iave is measured a short time later. V2 is measured at t2, and I2 is measured a short time later. If the short time delay is much less than the time difference between t1 and t2, the accuracy in the calculated results may only be slightly affected.

Figure 4:
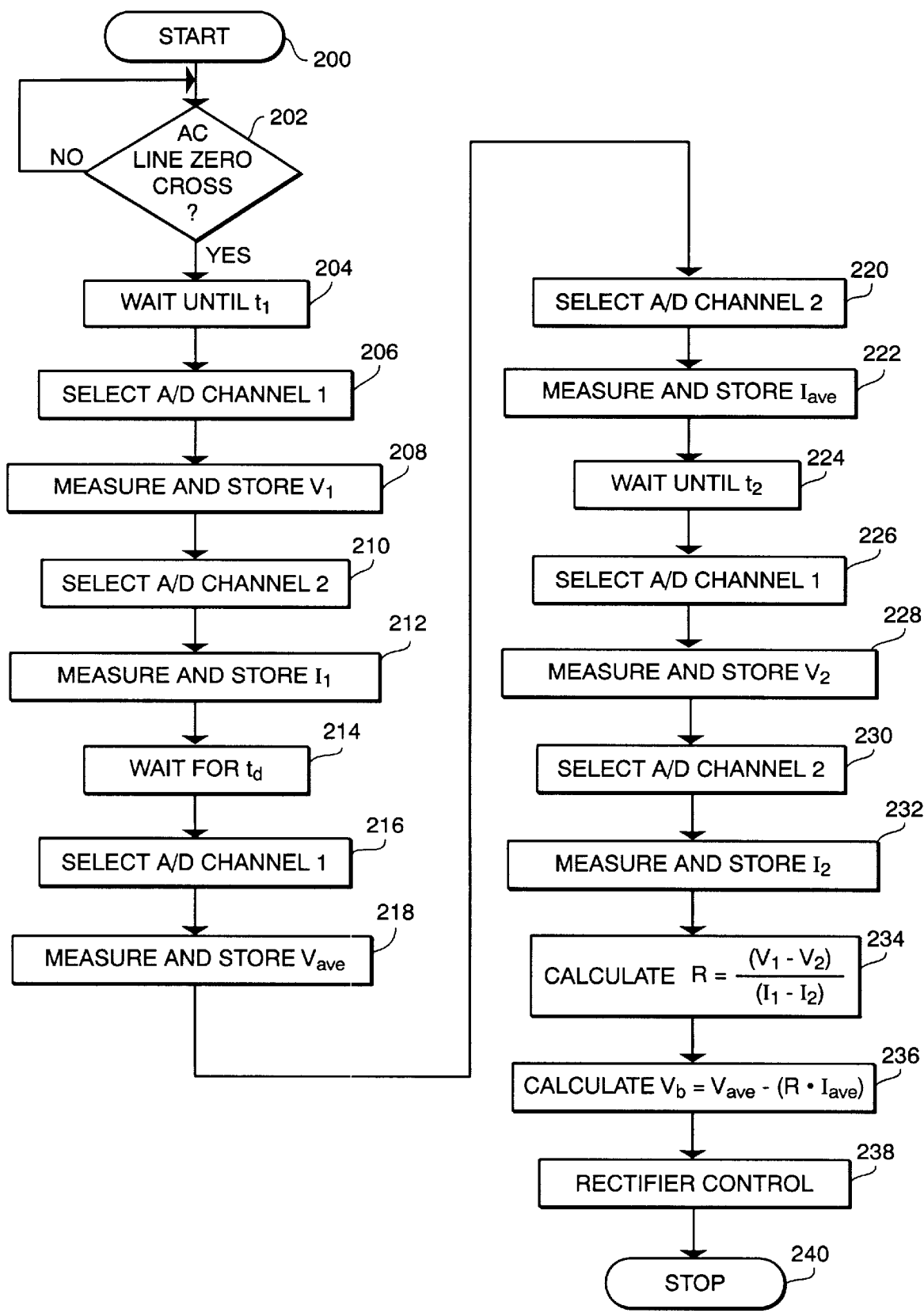
FIG. 4 is a flow diagram for the economic microcontroller charger circuit.

Referring FIG. 4, the process starts 200 and waits 202 for the zero crossing point of the AC power waveform from which time t1 is referenced. After time t1 wait state has elapsed 204, the A/D converter 40c is controlled to select 206 the input from first channel to which is connected the unfiltered signals from amplifiers 34 which represent the voltage V across capacitor 14. The A/D converter 40c is next commanded to convert input signal, and return 208 the digital values V1 as a measurement to the microcontroller 30b for storage and later processing computation and control. The A/D converter 40c is then controlled to select 210 the second input channel to which is connected the unfiltered signal from amplifier 36 which represent the current I across shunt resistor 18. The A/D converter 40c is then commanded to convert input signal, and return 212 the digital values I1 as a measurement to the microcontroller 30b for storage and later processing computation and control. Another wait state 214 of time length td is elapsed. Time td will cause the Vave measurement 218 to start at a point which is approximately half-way between times t1 and t2. After time td wait state has elapsed 214, the A/D converter 40c is controlled to select 216 the input from first channel to convert voltage V across capacitor 14. The A/D converter 40c is next commanded to convert input signal, and return 218 the digital values Vave as a measurement to the microcontroller 30b for storage. The A/D converter 40c is then controlled to select 220 the second input channel to convert I across shunt resistor 18. The A/D converter 40c is then commanded to convert input signal, and return 222 Iave as a measurement to the microcontroller 30b for storage. After time t2 wait state has elapsed 224, the A/D converter 40c is controlled to select 226 inputs from the first channel to convert the voltage V. The converters 40c is again commanded to convert the input signal V and return 228 the digital values V2 as a measurement to the microcontroller 30b for storage. The A/D converter 40c is then controlled to select 230 the input from the second channel to convert the current signal I. The converters 40c is again commanded to convert the input signal I and return 232 the value I2 as a measurement to the microcontroller 30b for storage. The dynamic values V1, I1, V2 and I2 are then used by the microcontroller 30b to calculate 234 the charging circuit series resistance R. The microcontroller 30b then uses the average values Vave and Iave and the series resistance value R to compute the open circuit float voltage Vb of the battery 26. These calculated values are used by the microcontroller 30b to generate 238 control signals to rectifier control 32 to control rectifying diodes 12 to charge the battery, prior to completion 240 of measurement and control process.

After repetitive measurements, R may begin to increase, thereby indicating an increase in the Rb battery internal resistance 28. A predetermined time period after the increase in Rb, the microcontroller 30 preferably should stop charging battery to prevent damage. For example, charging may be terminated approximately 1.5 hours for a typical twenty-four volt, fifty amp-hour battery. The microcontroller has an ability to continuously monitor the charging circuit resistance R, and the battery float voltage Vb. The status of these parameters can be communicated to a central monitoring facility for comparison with previous trends and appropriate analysis. An advantage of this invention is that there are no additional circuit components required other than those which are normally present in a micro-controller based battery charger. The expense of additional power switching components as used in some prior art, is thus eliminated. Those skilled in the art are familiar with conventional programming techniques and electronics designs to perfect detailed operation or design specifics. Persons skilled in the art of analog signal processing and programming will recognize that a number of different embodiments may be used to accomplish the objects of the invention.

The preferred embodiment could be improved and enhanced. For example, the design of the power transformer 10 may have an internal impedance presented to one rectifying diode that is less than that presented to the second rectifying diode. In this case, one current pulse peak to peak value of the raw current waveform will be greater than the other in that AC wave cycle, causing some fundamental frequency component to be present in the current waveform. If this is the case, the dynamic measurements which are required by this invention will different from one half-cycle to the next. To enable accurate calculated results in the presence of an unbalanced transformer 10, it may be necessary to add to the programming of the microcontroller 30 which will average two sets of measurement and calculations, so that the result represents the value for one full line cycle. While the preferred embodiment could be improved and enhanced, those improvements and enhancements may nonetheless fall within the spirit and scope of the following claims.

What is claimed is:

1. A method for determining battery charging circuit resistance R of a charging resistance loop extending through a charger and a storage battery, the method comprising the steps of, charging the storage battery coupled to a charging capacitor in the charging loop, measuring a voltage V1 across a charging capacitor at a time t1 when the battery is charged by energy supplied by the charging capacitor, measuring a current I1 conducting through the battery at the time t1, measuring a voltage V2 across the charging capacitor at a time t2 when the battery is charged by energy supplied by the charging capacitor at time t2, measuring a current I2 passing through the battery at time t2, and calculating the battery charging circuit resistance R across the charging capacitor and through the battery, and measuring a voltage Vave across the charging capacitor at time td between time t1 and time t2, measuring a current Iave conducting through the battery at time td, and determining an open circuit battery voltage Vb using R, Vave and Iave.

2.. The method of claim 1 wherein the determining step, Vb is calculated by subtracting the product R and Iave from Vave.

3. A method for determining battery charging circuit resistance R of a charging resistance loop extending through a charger and a storage battery, the method comprising the steps of, charging the storage battery coupled to a charging capacitor in the charging loop, measuring a voltage V1 across the charging capacitor at a time t1 when the battery is charged by energy supplied by the charging capacitor, measuring a current I1 conducting through the battery at the time t1, measuring a voltage V2 across the charging capacitor at a time t2 when the battery is charged by energy supplied by the charging capacitor at time t2, measuring a current I2 passing through the battery at time t2, and calculating the battery charging circuit resistance R across the charging capacitor and through the battery, and detecting changes in the battery charging circuit resistance R, and terminating charging of the storage battery.

4. A method for determining battery charging circuit resistance R of a charging resistance loop extending through a charger and a storage battery, the method comprising the steps of, charging the storage battery coupled to a charging capacitor in the charging loop, measuring a voltage V1 across the charging capacitor at a time t1 when the battery is charged by energy supplied by the charging capacitor, measuring a current I1 conducting through the battery at the time t1, measuring a voltage V2 across the charging capacitor at a time t2 when the battery is charged by energy supplied by the charging capacitor at time t2, measuring a current I2 passing through the battery at time t2, and calculating the battery charging circuit resistance R across the charging capacitor and through the battery.

5. The method of claim 4 wherein the calculating step, the battery charging circuit resistance R is calculated by dividing the difference of V1 and V2 by the difference of I1 and I2.

6. The method of claim 4 wherein V1 and I1 are measured concurrently, and V2 and I2 are measured concurrently.

7. The method of claim 4, wherein there is a time delay between the measurement steps of V1 and V1, and also between measurements steps V2 and I2.

* * * * *